Patented Apr. 21, 1953  2,635,953

UNITED STATES PATENT OFFICE 2,635,953

INFLAMMABLE COMPOSITIONS INCLUDING RED PHOSPHORUS

Martin S. Silverstein, Camden, N. J., and Joseph J. Jakabcin, Philadelphia, Pa.

No Drawing. Application October 8, 1947, Serial No. 778,722

28 Claims. (Cl. 52—2)

(Granted under Title 35, U. S. Code (1952), sec. 266)

The invention described herein may be manufactured and used by or for the Government for governmental purposes, without the payment to us of any royalty thereon.

The present invention relates to compositions including red phosphorus as one of two or more ingredients which comprise those compositions, and is a continuation-in-part of our co-pending application Serial No. 522,110 filed February 12, 1944, now abandoned. As will be shown below, compositions prepared according to our present invention may be used for military and non-military purposes according to the nature and properties of the ingredients which comprise those compositions.

More particularly, the present invention relates to inflammable compositions of matter including red phosphorus and a solid oxidizing agent. By the term "inflammable compositions of matter," just mentioned and hereinafter referred to, it should be understood that it is sufficiently broad to include reference to ammunition primers and especially to the flame producing compositions in such primers.

In co-pending application for Letters Patent, Serial No. 519,949, filed on January 27, 1944, in the name of Martin S. Silverstein, one of the joint applicants of the present application, there is disclosed a process for rendering red phosphorus containing iron compounds and other metal compounds more resistant to oxidation. The said process may be practiced, as disclosed in the said application, by exposing pulverulent red phosphorus of commerce, containing from 200 to 700 parts of iron (calculated as Fe) per million parts of red phosphorus, to a current or circulation of atmospheric air at 40° C. and relative humidity of 90 percent for a period of from 2 to 20 days; whereupon the so treated phosphorus is suspended in water, filtered, washed on the filter until the washings are no longer acid to litmus paper, and thereafter dried. To these steps may also be added the step of removing particles of red phosphorus less than ten microns in diameter from the red phosphorus at some stage after the exposure to said atmosphere, preferably after the step of washing to remove the acids resulting from the partial oxidation. This process produces red phosphorus which is highly resistant to oxidation and whose iron content lies between, or does not exceed, 5 to 30 parts of iron per million parts of red phosphorus. For example, an exposure as above described for a period of 19 days results in red phosphorus containing not more than 10 parts of iron per million parts of phosphorus.

In co-pending application for Letters Patent, Serial No. 519,950, filed on January 27, 1944, in the names of George F. Nordbolm and Martin S. Silverstein, the latter being one of the joint applicants of the present application, there is disclosed another process for preparing red phosphorus which is highly resistant to oxidation from red phosphorus of commerce containing from 200 to 700 parts of iron per million parts of red phosphorus. This process is advantageously practiced by suspending finely divided red phosphorus in a 5% water solution of sulphuric acid or other mineral acid and boiling for a period of one-quarter hour to four hours. The boiling should be vigorous enough to keep the particles of phosphorus agitated in the acid solution, or else mechanical agitation should be applied to ensure good agitation. The red phosphorus and acid solution are advantageously used in the ratio of 100 grams of red phosphorus to 500 milliliters of acid solution. After this acid treatment with application of heat and agitation, the red phosphorus is washed free of acid by means of water and thereafter dried. After the acid treatment but before the final drying, the mass of red phosphorus may be treated by some known process to remove particles of phosphorus less than ten microns in diameter. The phosphorus products which may be obtained according to this process are highly resistant to oxidation and the iron content thereof reaches the low levels of less than 5 parts of iron per million parts of red phosphorus, and even less than one part of iron per million parts of red phosphorus.

The removal of iron compounds from the red phosphorus is accompanied by an increased resistance to oxidation by air, or by solid oxidizing agents which may be mixed therewith in the preparation of primer compositions for ammunition primers, or in the preparation of pyrotechnic and incendiary compositions.

The iron compounds occurring in red phosphorus act as catalysts or accelerators of oxidation of the red phosphorus and the reduction in amounts in which they are present is accompanied by increased resistance of the red phosphorus to oxidation. The said processes also occasion reduction in amounts of other metal compounds which also are present in red phosphorus, and which are dissolved by mineral acids such as phosphoric and sulphuric acids. Copper compounds and some other metal compounds also tend to increase the oxidation of red phosphorus, but, since they are present in amounts much less than that of iron compounds, the latter have been found to be the most objectionable oxidation catalysts for red phosphorus in the red phosphorus now sold on the market.

While the red phosphorus prepared according to the above-described processes of the said two patent applications is highly useful in the preparation of primer compositions and other inflammable compositions where stability and keeping qualities are desirable or essential, we have found that the red phosphorus or red phosphorus products produced according to the said two processes or applications may be further enhanced in resistance to oxidizing agents, such as moist air and solid oxidizing agents for red phosphorus, by incorporating the hydroxides of aluminum, magnesium, or zinc in the red phosphorus prepared according to the said two applications. We have further found that some of such mixtures are excellently suited for preparing primer compositions for use in the primers of small arms ammunition by mixing the same with a pulverulent solid oxidizing agent for red phosphorus, with or without such materials as powdered antimony sulphide or powdered zirconium.

In co-pending application for Letters Patent, Serial No. 750,867, filed on May 27, 1947, in the name of Martin S. Silverstein, one of the joint applicants of the present application, there are disclosed compositions comprising a solid oxidizing agent for red phosphorus and red phosphorus containing not more than 90 parts of iron and 30 parts of copper per million parts of red phosphorus. In that co-pending application reference was given to a discovery made by the co-inventors hereof that, where the iron content exceeds 30 parts per million and the copper content exceeds 20 parts per million parts of phosphorus, it is particularly advantageous to include one of the following metallic hydroxides—aluminum, magnesium, or zinc—because of their ability to retard the oxidation rate of red phosphorus. In making this disclosure, the said copending application Serial No. 750,867 made cross reference to our own co-pending application Serial No. 522,110 of which the present application is as aforesaid, a continuation-in-part.

Our first disclosure, in a patent application, of this use of aluminum hydroxide to stabilize red phosphorus against oxidation was in the said parent application of this case, namely Serial No. 522,110 filed on February 12, 1944. In that parent application we pointed out that compositions including red phosphorus and an oxidizing agent therefor, wherein the iron content was less than 30 parts of iron per million parts of phosphorus, could be stabilized against oxidation by addition thereto of hydrated alumina.

Although not mentioned in that disclosure, we had found that certain other metallic hydroxides, namely those of magnesium and zinc, may accomplish the same result as could hydrated alumina, although with somewhat lesser efficiencies. We had also found that, depending on the end use required for the red phosphorus-containing composition, the inclusion of one of the three named metallic hydroxides therein makes possible the satisfactory stabilization of the composition even though the iron content considerably exceeds 30 parts per million. In the case where it is necessary to attain the highest possible degree of stabilization for such compositions, such as where they are to be used for ammunition primers, we have found that as much as 90 parts per million of iron can be tolerated when sufficient hydrated alumina is present. A lesser degree of stability is acquired when magnesium or zinc hydroxides are present in the composition, and accordingly when those hydroxides are used for primer grade red phosphorus compositions somewhat less than 90 parts per million of iron can be tolerated. However, inflammable compositions containing red phosphorus other than those used as primers, examples being toy caps, match heads, etc., can be satisfactorily stabilized for their respective purposes by inclusion therein of zinc or magnesium hydroxides even though as much as 90 parts per million of iron is present.

It should be understood that the marked improvement in the resistance of red phosphorus to oxidation that is obtained by adding the named metallic hydroxides to red phosphorus in accordance with the present invention is not obtainable by making such additions to the red phosphorus as it appears in commerce. Instead, as has been pointed out above, addition of the named oxidation inhibitors brings about desirable improvement in oxidation resistance when those materials are added to red phosphorus whose content of iron, copper, or other oxidation accelerators has been considerably lowered from the amounts normally found in commercial grade red phosphorus. For example, in the case of iron, which is the worst oxidation accelerator to be found in commercial red phosphorus (inasmuch as iron generally is present in that phosphorus in greater quantity than any other metallic compound which accelerates phosphorus oxidation), the benefits of adding aluminum, magnesium or zinc hydroxides are best obtainable when that iron content is lowered from an amount in excess of 200 parts per million normally in red phosphorus of commerce to below 30 parts per million in accordance with the methods of the co-pending applications described above. However, it should be understood from foregoing explanations that perfectly satisfactory stabilization can be achieved with red phosphorus-containing compositions, intended for certain uses, having up to 90 parts of iron per million parts of the red phosphorus.

The importance of thus being able to utilize red phosphorus in inflammable compositions wherein the iron content is lowered only to 90 parts, instead of going down as far as 30 parts per million, will be evident when it is realized how much simpler it is to reduce the iron content of commercial grade red phosphorus to 90 parts per million, rather than reduce it to a maximum of 30 parts per million. The actual reduction to the 90 parts per million limit may be effected by reducing the length of the preoxidation treatment described in the abovementioned co-pending application Serial No. 519,949, or by reducing the length of the aforesaid acid treatment described by the abovementioned co-pending application Serial No. 519,950. In fact, there is an even simpler method (first disclosed in the aforesaid co-pending application Serial No. 750,867) by which the iron content may be reduced to 90 parts per million when the commercial grade red phosphorus has iron not much more in excess of 200 parts per million. This process consists of first washing the commercial phosphorus with water which immediately effects a reduction in iron content to approximately 125–150 parts per million parts of phosphorus; then separating out the particles of red phosphorus under 10 microns in diameter by any conventional method such as elutriation, sedimentation or flotation.

The named metallic hydroxides, useful for the purposes above described, may be prepared as follows. The hydrated alumina preferably is freshly prepared from aluminum hydroxide obtained by precipitation upon mixing an aqueous solution of an aluminum salt, for example, aluminum sulphate or sodium or potassium alum.

The magnesium hydroxide may be prepared by reacting a solution of magnesium sulphate with a solution of sodium hydroxide, filtering off the magnesium hydroxide which forms, and washing the product free of water soluble sulphates.

The zinc hydroxide likewise can be made by reacting a solution of zinc sulphate with a solution of sodium hydroxide, filtering off the resultant precipitation of zinc hydroxide, and washing same with water until free of soluble sulphates.

The precipitation of the hydroxides of aluminum, magnesium or zinc may be accomplished separately, and thereafter the resulting hydroxide intimately mixed with the red phosphorus. However, if desired, the metallic hydroxide may be caused to be precipitated in the presence of the red phosphorus with which it is to be mixed, whereby the intimate association of the hydroxide and the red phosphorus results as the hydroxide is formed. The following examples illustrate the practice of this invention:

EXAMPLE I 162 grams of sodium bicarbonate, $NaHCO_3$, are dissolved in 1500 ml. of distilled water, and 215 grams of crystallized aluminum sulphate, $(Al_2)(SO_4)_3.18H_2O$, are dissolved in another 1500 ml. of distilled water. Both solutions are preferably heated to a temperature of 50–55° C. It is advantageous to filter both of said solutions, either before or after heating, in order to remove any insoluble impurities, even though chemically pure grades of the two reagents are employed. With both solutions at 50–55° C., the solution of the aluminum sulphate is added to the solution of the sodium bicarbonate with stirring. The precipitate of aluminum hydroxide is filtered off and washed with distilled water until free of water soluble sulphates, alkaline material and carbonates. The aluminum hydroxide so obtained is then placed in or mixed with distilled water so that one liter of the mixture contains 50 grams of aluminum hydroxide in suspension.

With the aluminum hydroxide well dispersed throughout the water in which it is contained, so much of the suspension is added with stirring to red phosphorus prepared as described above (i. e., containing 90 or less parts of iron per million parts of phosphorus) as to give an intimate mixture containing from 0.5 to 10 percent, preferably 2.4 percent, aluminum hydroxide on the dry basis, when the preparation of primer composition is one of the purposes for which the resulting composition is intended. (The said percentages of the oxidation inhibitor in this and the succeeding examples are based on the weight of phosphorus.) This mixture is stirred for approximately one hour, filtered, and dried in a vacuum oven for eight hours at a temperature of 55–60° C. under a pressure of about 29 inches of mercury below atmospheric pressure. At this point, the mixture is ready for incorporation into a primer composition, or into an incendiary or pyrotechnic composition containing a solid oxidizing agent such as barium nitrate, strontium nitrate, potassium or sodium nitrate, potassium chlorate, barium peroxide, lead peroxide or other solid oxidizing agents which may be used in said compositions.

It is to be understood, that the proportion of aluminum hydroxide that is intimately mixed with the said processed red phosphorus may be varied or chosen with regard to the use to which the said composition of said red phosphorus and aluminum hydroxide is to be put.

EXAMPLE II

An aqueous solution of sodium bicarbonate and an aqueous solution of aluminum sulphate are prepared as described in Example I. Either one of these solutions is added to red phosphorus prepared according to either of the said two above mentioned processes, and an intimate mixture formed by stirring, whereupon the other of said solutions is added to the mixture accompanied by stirring. It will be understood that in this instance the precipitation of the aluminum hydroxide takes place in the presence of the said red phosphorus and while it is in suspension. These operations may be conducted with the reagents at room temperature, but it is preferred to perform them while the reagents are at a temperature of from 50–55° C. The amounts of the said solutions and of said processessed red phosphorus that are employed above are chosen so as to give in the final composition the aluminum hydroxide proportions indicated in Example I.

After the aluminum hydroxide has been precipitated in the presence of the said red phosphorus, as described above, the intimate mixture of said red phosphorus and aluminum hydroxide is filtered off from the aqueous medium in which it was formed. Filtering with suction is preferable. The mixture is then dried as described in Example I. After the last mentioned filtering operation the mixture may or may not be washed on the filter. It was found that it is not necessary or advantageous to wash out the by-product, sodium sulphate, of the reaction when the above specified solutions and procedure are employed. When any appreciable excess of either sodium bicarbonate or aluminum sulphate is present after the precipitation of the aluminum hydroxide, washing the mixture after separating it by filtration or otherwise is preferred.

EXAMPLE III

An aqueous solution of sodium bicarbonate and an aqueous solution of aluminum sulphate are prepared as described in Example I. The solution of the aluminum sulphate is added to the solution of sodium bicarbonate with stirring. The precipitate of aluminum hydroxide is filtered off and washed with distilled water until free of water soluble sulphate. The aluminum hydroxide so obtained is dried and powdered. At this point, the hydrated alumina so obtained is mixed with red phosphorus prepared as described above in proportions equivalent to 0.5 to 10.0 percent aluminum hydroxide.

EXAMPLE IV

The dry mixture of said red phosphorus and hydrated alumina prepared as described in Examples I, II and III and containing hydrated alumina equivalent to 2.4 percent of aluminum hydroxide is used to prepare primers and primer compositions in accordance, for example, with the disclosures of U. S. Patent No. 2,194,480 granted March 26, 1940, to C. H. Pritham, E. R.

Rechel, and Thomas Stevenson. In preparing primers and primer compositions according to the disclosures of said patent, the metallic fuels used therein may be entirely eliminated, so that the priming composition may be formed from the said dry mixtures of Examples I and II above and one or more of the solid oxidizing agents mentioned in said patent. For example, a mixture containing 50 to 90 percent of barium nitrate and 50 to 10 percent of the dry mixture prepared according to Examples I and II above, intimately mixed with a suitable binder or adhesive, as gum arabic or gum tragacanth dissolved in water, may be inserted in the primer cups of primers, and then dried in a vacuum oven or in hot air at atmospheric pressure.

EXAMPLE V 212 grams of magnesium sulphate, $MgSO_4.7H_2O$, are dissolved in 1500 ml. of distilled water, and 67 grams of sodium hydroxide, NaOH, are dissolved in 1000 ml. of distilled water. It is advantageous to filter both of said solutions, in order to remove any insoluble impurities, even though chemically pure grades of the two reagents are employed. The solution of sodium hydroxide is slowly added to the solution of magnesium sulphate, the solution at the same time being constantly stirred. The precipitate of magnesium hydroxide which forms is filtered off and washed with distilled water until free of water soluble sulphates. The so obtained magnesium hydroxide is then placed in or mixed with distilled water so that one liter of the mixture contains 50 grams of magnesium hydroxide in suspension.

With the magnesium hydroxide well dispersed throughout the water in which it is contained, so much of the suspension is added with stirring to red phosphorus prepared as described above (i. e., containing 90 or less parts of iron per million parts of the phosphorus) as to give an intimate mixture containing from 0.5 to 10.0% magnesium hydroxide on the dry basis. This mixture is stirred for approximately one hour, filtered, and dried in a vacuum oven for 8 hours at a temperature of 55–60° C. under a pressure of about 29 inches of mercury below atmospheric pressure. At this point the mixture is ready for forming into an inflammable composition by mixing it with a solid oxidizing agent, such as barium nitrate, strontium nitrate, potassium or sodium nitrate, potassium chlorate, barium peroxide, lead peroxide, or other such agent which may be used in said compositions.

It is to be understood that the proportion of magnesium hydroxide that is intimately mixed with the said processed red phosphorus may be varied or chosen with regard to the use to which the said composition of said red phosphorus and magnesium hydroxide is to be put.

EXAMPLE VI 145 grams of zinc sulphate, $ZnSO_4.7H_2O$, are dissolved in 1500 ml. of distilled water, and 41 grams of sodium hydroxide, NaOH, are dissolved in 1000 ml. of distilled water. It is advantageous to filter both of said solutions, in order to remove any insoluble impurities, even though chemically pure grades of the two reagents are employed. The solution of sodium hydroxide is slowly added with stirring to the solution of zinc sulphate. The precipitate of zinc hydroxide which forms is filtered off and washed with distilled water until free of water soluble sulphates. The zinc hydroxide so obtained is then placed in or mixed with distilled water so that one liter of the mixture contains 50 grams of zinc hydroxide in suspension.

With the zinc hydroxide well dispersed throughout the water in which it is contained, so much of the suspension is added with stirring to red phosphorus prepared as described above (i. e., containing 90 or less parts of iron per million parts of the phosphorus) as to give an intimate mixture containing from 0.5 to 10.0% zinc hydroxide on the dry basis. This mixture is stirred for approximately one hour, filtered, and dried in a vacuum oven for 8 hours at a temperature of 55–60° C. under a pressure of about 29 inches of mercury below atmospheric pressure. At this point the mixture is ready for forming into an inflammable composition by mixing it with a solid oxidizing agent, such as barium nitrate, strontium nitrate, potassium or sodium nitrate, potassium chlorate, barium peroxide, lead peroxide, or other such agent which may be used in said compositions.

It is to be understood that the proportion of zinc hydroxide that is intimately mixed with the said processed red phosphorus may be varied or chosen with regard to the use to which the said composition of said red phosphorus and zinc hydroxide is to be put.

EXAMPLE VII

The dry mixture of said red phosphorus and magnesium hydroxide prepared as described in Example V may be used to prepare various types of inflammable compositions. Examples of such compositions and the methods for making same are as follows:

a. Compositions for striking surfaces

Mix 4 parts of glue with about 20 parts of water. Add 3 parts of the said red phosphorus-magnesium hydroxide mixture to the dilute glue solution, mixing the ingredients very thoroughly. Add 5 parts of antimony sulfide, again with thorough mixing, and finally add 1.5 parts of manganese dioxide to the composition, giving the composition a final thorough mixing before using it as a striking surface.

b. Scratch mixture for railway fusees

Mix 3 parts of glue with about 30 parts of water. Add 10 parts of the said red phosphorus-magnesium hydroxide mixture to the dilute glue solution, mixing the ingredients together very thoroughly. Add 8 parts of manganese dioxide, again with thorough mixing.

c. Toy caps

Mix 2 parts of gum binder in about 30 parts of water. Add 20 parts of potassium chlorate with thorough mixing, then add 8 parts of the said red phosphorus-magnesium hydroxide mixture, again with thorough mixing. Finally add 1 part of sulphur and give the entire composition a final very thorough mixing.

EXAMPLE VIII

The dry mixture of said red phosphorus and zinc hydroxide prepared as described in Example VI is used to prepare various types of inflammable compositions. Examples of such compositions and the methods for making same are those identified in Example VII above, with the ex- 18. A method of stabilizing red phosphorus which comprises reducing the iron content in red phosphorus of commerce to not more than 90 parts of iron per million parts of phosphorus, then suspending the red phosphorus in an aqueous medium and thereafter precipitating hydrated alumina in said aqueous medium while the red phosphorus is in suspension therein, the red phosphorus and the precipitated material being recovered together.

19. A method of stabilizing red phosphorus which comprises reducing the iron content in red phosphorus of commerce to not more than 90 parts of iron per million parts of phosphorus, then suspending the red phosphorus in an aqueous medium and thereafter precipitating magnesium hydroxide in said aqueous medium while the red phosphorus is in suspension therein, the red phosphorus and the precipitated material being recovered together.

20. A method of stabilizing red phosphorus which comprises reducing the iron content in red phosphorus of commerce to not more than 90 parts of iron per million parts of phosphorus, then suspending the red phosphorus in an aqueous medium and thereafter precipitating zinc hydroxide in said aqueous medium while the red phosphorus is in suspension therein, the red phosphorus and the precipitated material being recovered together.

21. A method of stabilizing red phosporus comprising reducing the iron content of the red phosphorus to not more than ninety parts of iron per million parts of phosphorus, thereafter suspending the phosphorus in an aqueous medium, and thereafter precipitating a material selected from the group consisting of hydrated alumina, zinc hydroxide and magnesium hydroxide in said aqueous medium while the red phosphorus is in suspension therein, the red phosphorus and the precipitated material being recovered together.

22. A method of stabilizing red phosphorus which comprises reducing the iron content of the red phosphorus to not more than ninety parts of iron per million parts of phosphorus, thereafter suspending the phosphorus in an aqueous medium, and thereafter precipitating hydrated alumina in said aqueous medium while the red phosphorus is in suspension therein, the red phosphorus and the precipitated material being recovered together.

23. A method of stabilizing red phosphorus which comprises reducing the iron content of the red phosphorus to not more than ninety parts of iron per million parts of phosphorus, thereafter suspending the phosphorus in an aqueous medium, and thereafter precipitating magnesium hydroxide in said aqueous medium while the red phosphorus is in suspension therein, the red phosphorus and the precipitated material being recovered together.

24. A method of stabilizing red phosphorus which comprises reducing the iron content of the red phosphorus to not more than ninety parts of iron per million parts of phosphorus, thereafter suspending the phosphorus in an aqueous medium, and thereafter precipitating zinc hydroxide in said aqueous medium while the red phosphorus is in suspension therein, the red phosphorus and the precipitated material being recovered together.

25. A primer for ammunition comprising a flame producing composition including a solid oxidizing agent, red phosphorus containing not more than about ten parts of iron per million parts of red phosphorus, and a material selected from the group consisting of hydrated alumina, zinc hydroxide and magnesium hydroxide in an amount sufficient to inhibit oxidation of the red phosphorus.

26. A primer for ammunition comprising a flame producing composition including a solid oxidizing agent, red phosphorus containing not more than about ten parts of iron per million parts of red phosphorus, and hydrated alumina in an amount sufficient to inhibit oxidation of the red phosphorus.

27. A primer for ammunition comprising a flame producing composition including a solid oxidizing agent, red phosphorus containing not more than about ten parts of iron per million parts of red phosphorus, and zinc hydroxide sufficient to inhibit oxidation of the red phosphorus.

28. A primer for ammunition comprising a flame producing composition including a solid oxidizing agent, red phosphorus containing not more than about ten parts of iron per million parts of red phosphorus, and magnesium hydroxide sufficient to inhibit oxidation of the red phosphorus.

MARTIN S. SILVERSTEIN.
JOSEPH J. JAKABCIN.

References Cited in the file of this patent

UNITED STATES PATENTS

| Number | Name | Date |
|---|---|---|
| 1,880,538 | Waggaman | Oct. 4, 1932 |
| 2,359,243 | Pernert | Sept. 26, 1944 |
| 2,399,120 | Hurd | Apr. 23, 1946 |

OTHER REFERENCES

Mellor—Comprehensive Treatise on Inorganic and Theoretical Chemistry—Longmans, Green and Co., New York, 1928, vol. 8, page 745.

ception that the said red phosphorus-zinc hydroxide mixture is substituted for the red phosphorus-magnesium hydroxide mixture given in those examples.

We claim:

1. An inflammable composition comprising an intimate mixture of a solid oxidizing agent, red phosphorus containing not more than about thirty parts of iron per million parts of red phosphorus, and a material selected from the group consisting of hydrated alumina, zinc hydroxide and magnesium hydroxide in an amount sufficient to inhibit oxidation of the red phosphorus.

2. An inflammable composition comprising an intimate mixture of a solid oxidizing agent, red phosphorus containing not more than about thirty parts of iron per million parts of red phosphorus, and hydrated alumina in an amount sufficient to inhibit oxidation of the red phosphorus.

3. An inflammable composition comprising an intimate mixture of a solid oxidizing agent, red phosphorus containing not more than about thirty parts of iron per million parts of red phosphorus, and zinc hydroxide in an amount sufficient to inhibit oxidation of the red phosphorus.

4. An inflammable composition comprising an intimate mixture of a solid oxidizing agent, red phosphorus containing not more than about thirty parts of iron per million parts of red phosphorus, and magnesium hydroxide in an amount sufficient to inhibit oxidation of the red phosphorus.

5. A primer for ammunition comprising a flame producing composition including a solid oxidizing agent, red phosphorus containing not more than about thirty parts of iron per million parts of red phosphorus, and a material selected from the group consisting of hydrated alumina, zinc hydroxide and magnesium hydroxide in an amount sufficient to inhibit oxidation of the red phosphorus.

6. An inflammable composition comprising a mixture including a solid oxidizing agent, red phosphorus containing not more than thirty parts of iron per million parts of red phosphorus, and hydrated alumina equivalent to 0.5 to 10 percent of aluminum hydroxide, this quantity being sufficient to inhibit oxidation of the red phosphorus.

7. An inflammable composition comprising an intimate mixture of a solid oxidizing agent, red phosphorus containing not more than about ninety parts of iron per million parts of red phosphorus, and a material selected from the group consisting of hydrated alumina, zinc hydroxide and magnesium hydroxide in an amount sufficient to inhibit oxidation of the red phosphorus.

8. An inflammable composition comprising an intimate mixture of a solid oxidizing agent, red phosphorus containing not more than about ninety parts of iron per million parts of red phosphorus, and hydrated alumina in an amount sufficient to inhibit oxidation of the red phosphorus.

9. An inflammable composition comprising an intimate mixture of a solid oxidizing agent, red phosphorus containing not more than about ninety parts of iron per million parts of red phosphorus, and zinc hydroxide in an amount sufficient to inhibit oxidation of the red phosphorus.

10. An inflammable composition comprising an intimate mixture of a solid oxidizing agent, red phosphorus containing not more than about ninety parts of iron per million parts of red phosphorus, and magnesium hydroxide in an amount sufficient to inhibit oxidation of the red phosphorus.

11. A primer for ammunition comprising a flame producing composition including a solid oxidizing agent, red phosphorus containing not more than about ninety parts of iron per million parts of red phosphorus, and hydrated alumina in an amount sufficient to inhibit oxidation of the red phosphorus.

12. A composition of matter comprising a mixture of red phosphorus containing not more than about ninety parts of iron per million parts of red phosphorus, and hydrated alumina equivalent to substantially 0.5 to 10 percent of aluminum hydroxide, the said percentages being based on the weight of the red phosphorus.

13. A method of stabilizing red phosphorus comprising reducing the iron content of the phosphorus to not more than ninety parts of iron per million parts of phosphorus and thereafter intimately mixing the phosphorus with hydrated alumina equivalent to form 0.5 to 10 percent of aluminum hydroxide, the said percentages being based on the weight of the red phosphorus.

14. A method of stabilizing red phosphorus comprising reducing the iron content of the phosphorus to not more than ninety parts of iron per million parts of phosphorus, forming an aqueous slurry of the resultant phosphorus with from 0.5 to 10 per cent of aluminum hydroxide, the said percentages being based on the weight of the red phosphorus, and thereafter filtering and drying the solids from said slurry.

15. A method of stabilizing red phosphorus comprising reducing the iron content of the phosphorus to not more than ninety parts of iron per million parts of phosphorus, mixing the phosphorus with sodium bicarbonate, thereafter adding aluminum sulphate to the red phosphorus-sodium bicarbonate mixture, said bicarbonate and sulphate being present in an amount sufficient to form 0.5 to 10 per cent aluminum hydroxide on a dry basis, the said percentages being based on the weight of the red phosphorus, whereby the hydrated alumina is permitted to precipitate in the presence of the red phosphorus and those materials are recovered together.

16. A method of stabilizing red phosphorus comprising reducing the iron content of the phosphorus to not more than ninety parts of iron per million parts of phosphorus, mixing the phosphorus with aluminum sulphate, thereafter adding sodium bicarbonate to the red phosphorus-aluminum sulphate mixture, said bicarbonate and sulphate being present in an amount sufficient to form 0.5 to 10 percent aluminum hydroxide on a dry basis, the said percentages being based on the weight of the red phosphorus, whereby the hydrated alumina is permitted to precipitate in the presence of the red phosphorus and those two materials are recovered together.

17. A method of stabilizing red phosphorus which comprises reducing the iron content in red phosphorus of commerce to not more than 90 parts of iron per million parts of phosphorus, then suspending the red phosphorus in an aqueous medium and thereafter precipitating a material selected from the group consisting of hydrated alumina, zinc hydroxide and magnesium hydroxide in said aqueous medium while the red phosphorus is in suspension therein, the red phosphorus and the precipitated material being recovered together.